(12) United States Patent
Lee (10) Patent No.: US 6,205,861 B1
(45) Date of Patent: Mar. 27, 2001

(54) TRANSDUCER HAVING TEMPERATURE COMPENSATION

(75) Inventor: Shih-Ying Lee, Lincoln, MA (US)

(73) Assignee: Setra Systems, Inc., Boxboro, MA (US)

( * ) Notice: Subject to any disclaimer, the term of this patent is extended or adjusted under 35 U.S.C. 154(b) by 0 days.

(21) Appl. No.: 09/235,705

(22) Filed: Jan. 22, 1999

(51) Int. Cl.$^7$ ........................................................ G01L 9/12
(52) U.S. Cl. ................................................................ 73/724
(58) Field of Search .......................... 73/708, 718, 724; 361/283.1, 283.4, 283.3

(56) References Cited

U.S. PATENT DOCUMENTS

| | | | |
|---|---|---|---|
| 5,663,506 | 9/1997 | Moore et al. | 73/708 |
| 5,757,608 | 5/1998 | Bernot et al. | 361/283.4 |
| 5,817,943 | 10/1998 | Welles, II et al. | 73/718 |

*Primary Examiner*—William Oen
(74) *Attorney, Agent, or Firm*—McDermott, Will & Emery (57) ABSTRACT

A capacitive pressure transducer includes a conductive diaphragm positioned between pneumatically separated chambers defined by concave body members. The diaphragm is fixed and sealingly coupled at its periphery to the peripheral rim of the concave body members. The diaphragm can be supported in tension by the peripheral rim of the body members. An electrode assembly, supported by one body member, establishes a substantially planar conductive surface opposite to and spaced apart by a nominal gap from the conductive diaphragm. The capacitive pressure transducer further includes a thermal compensation element securely coupled to the inside surface or the outside surface of one of the concave body members and/or to the electrode. The thermal compensation element has a different coefficient of thermal expansion from that of the concave body member or electrode to which it is attached. The combination of the concave body member or electrode and thermal compensation element having different coefficients of thermal expansion results in a bimetallic action which produces a thermally dependent force that compensates or counter-acts the thermally induced changes in the characteristics of the transducer.

33 Claims, 8 Drawing Sheets

CALIBRATION OF A PRESSURE TRANSDUCER
AT TWO TEMPERATURES

FIG. 1

CONSTRUCTION OF BI-METAL DISC
AND CHANGE OF SHAPE W. TEMPERATURE

GENERAL TEMPERATURE COMPENSATION SCHEME
FOR COMPENSATION OF SENSITIVITY AND
ZERO CHANGE WITH TEMPERATURE OF A PRESSURE
SENSOR

*FIG. 10*

TRANSDUCER HAVING TEMPERATURE COMPENSATION

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

BACKGROUND OF THE INVENTION

This invention relates to capacitive pressure transducers having a stationary electrode and a movable diaphragm and, more particularly, to a capacitive pressure transducer which can compensate for thermally induced changes in sensitivity and initial capacitance.

Capacitive pressure sensors typically include a fixed element having a rigid, planar conductive surface forming one plate of a substantially parallel plate capacitor and a deformable conductive member, such as a metal foil diaphragm, which forms the other plate of the capacitor. Generally, the diaphragm is edge-supported, having a central portion that is movable and positioned substantially parallel to and opposite the fixed plate. Since the sensor generally has the form of a parallel plate capacitor, the characteristic capacitance of the sensor is inversely proportional to the gap, d, between the central portion of the diaphragm and the conductive surface of the fixed element. In order to provide a pressure differential across the diaphragm, the region on one side of the diaphragm is sealed or pneumatically separated from the region on the opposite side.

In practice, the geometry and physical characteristics of the diaphragm are selected so that the pressure differentials across the diaphragm in a particular range of interest cause predetermined displacements of the central portion of the diaphragm. These pressure differential-induced displacements result in corresponding variations in the gap, d, between the two capacitor plates, and thus in capacitance variations produced by the transducer. For relatively high sensitivity, such transducers require large changes of capacitance in response to relatively small gap changes. To achieve such sensitivity from unit to unit, nominal gap dimensions need to be very small and generally require that their component parts be manufactured to very close tolerances to establish the required dimensional relationships. In addition, the structure and materials must maintain those relationships over a useful temperature range.

One type of pressure transducer ("tensioned diaphragm transducer") includes a tensioned diaphragm that is peripherally supported by the rim of a concave body member of the transducer, where the diaphragm is relatively thin and it is maintained under radially directed tension which is directly related to the pressure deflection sensitivity of the diaphragm. Another type ("bending diaphragm transducer") has a generally similar structure, but the diaphragm is relatively thick and is not maintained in tension. The pressure deflection relationship depends on the bending rigidity of the diaphragm. Both types are typically configured to provide changes in capacitance with changing pressure across the diaphragm. In both types of transducers, the diaphragm and the body member are ideally constructed of materials having identical coefficients of thermal expansion. However, in practice that does not occur. As a result, changes in temperature cause the diaphragm and the body member to expand or contract at different rates thus causing effects on transducer output. For tension diaphragm transducers, there are two effects which affect the accuracy of the transducer. The first effect is the change of sensitivity of a sensor due to change of temperature. The sensitivity is the slope of the calibration curve of a transducer. For a capacitive type pressure transducer with a tensioned diaphragm, the sensitivity is related to the motion of the diaphragm per unit pressure. The second effect is the change of "zero" of a sensor due to the change of temperature. The "zero" is the output of a transducer at zero pressure or some other reference pressure. For a capacitive transducer, the "zero" is related to the initial value of the capacitance when the pressure is zero, or some other designated pressure. Initial capacitance is related to the initial gap, area of the electrode as well as other factors such as the leakage capacitance across the insulation material. For bending diaphragm transducers, only the "change of zero" effect is present. The sensitivity change with temperature is generally caused by the change of modulus of elasticity of the diaphragm material and generally not very significant.

Figure 1:
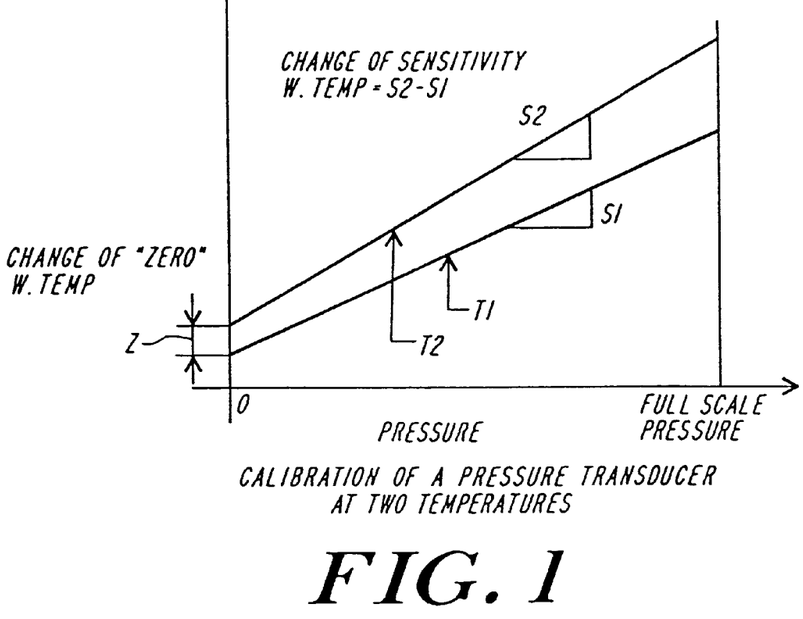
FIG. 1 shows exemplary calibration curves for a transducer at two temperatures T1 and T2.

FIG. 1 shows an exemplary calibration curve for a transducer at two different temperatures T1 and T2. As shown for each temperature, the output is substantially linear with pressure, with sensitivity equal to S1 at T1 and S2 at T2, yielding a temperature induced "change in sensitivity" equal to S2–S1 for the transducer. For the example of FIG. 1, at pressure equal to zero, there is a difference "Z" in output, representing the temperature induced "change in zero" for the transducer. It is desirable that there is no change in sensitivity and zero over the operational range in temperature for a transducer.

Accordingly, it is an object of the present invention to provide an improved pressure transducer.

Yet another object of the present invention is to provide an improved pressure transducer that is relatively inexpensive and easy to manufacture.

Still another object of the present invention is to provide an improved pressure transducer which compensates for thermally induced changes in sensitivity.

A further object of the present invention is to provide an improved pressure transducer which compensates for thermally caused changes in the output of a transducer at a predetermined (or zero) ambient pressure.

SUMMARY OF THE INVENTION

The present invention is directed to an improved capacitive pressure transducer, adapted for high accuracy measurement of pressure using a low cost, easily manufactured structure. The transducer includes a conductive diaphragm or a diaphragm having an electrically conductive portion, supported at its periphery by the peripheral rim of a concave body member. In tensioned diaphragm transducer, the diaphragm is tensioned whereby the tension is radially outwardly directed from a central sensing axis about which the diaphragm extends, and portions of the diaphragm are movable along the sensing axis with changes in pressure. In bending diaphragm transducer, the diaphragm is supported so that it bends or deforms with pressure along its sensing axis. In both types, the region interior to the body member and bounded by a first side of the diaphragm creates a chamber that can be pneumatically isolated from the outer region of the body member. An electrode assembly can be rigidly coupled to the base member in order to establish a conductive surface opposite to, and uniformly spaced apart by a nominal gap from, the conductive diaphragm. The conductive surface of the electrode is preferably planar, but may differ slightly, for example, being slightly concave to match the anticipated maximum deflections of the diaphragm in use. The pressure in the outer region with respect to the pressure in the first chamber can be determined as a function of the capacitance at that pressure and the capacitance at some predefined initial pressure.

The invention is based on the "bi-metal" principle to compensate for the output changes of a transducer due to the temperature variations. In accordance with that principal, two flat disks with different coefficients of expansion when fused together become a bi-metal element. If it is flat at one temperature, it will become domed when the temperature changes. The direction and amount of the change of the curvature depends on A. The relative geometry (size, shape, dimensions) of the two discs.
B. The relative value of the coefficient of expansion and other physical properties of the two materials.
C. The sign and magnitude of the temperature change.

Figure 2:
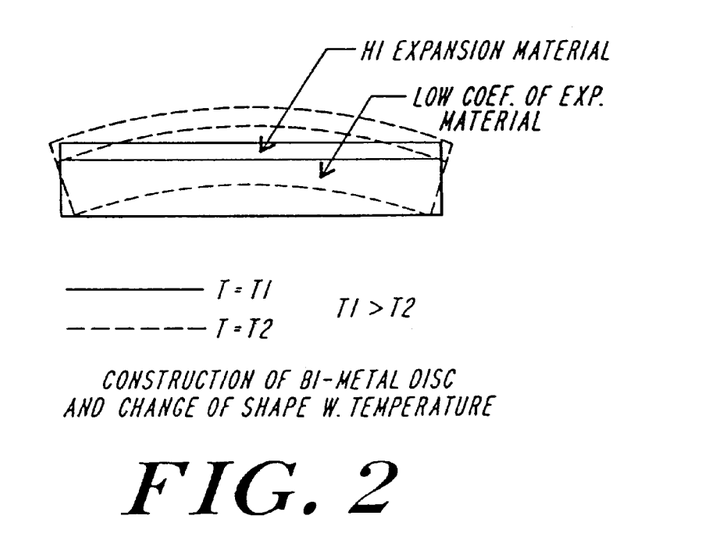
FIG. 2 illustrates the bi-metal compensation principal utilized by the invention.

The bi-metal principal is illustrated in FIG. 2. This principle not only applies to two flat disks; it also applies to parts, which are initially domed in shape. Furthermore, the disks do not have to be solid; they could be in the shape of washers, i.e. annular elements.

In accordance with the invention, bi-metal elements are established in transducers to offset the "change of sensitivity" effects (mainly for tensioned diaphragm transducers) and the "change in zero" effect (for both tensioned and bending diaphragm transducers), so that a calibration curve (such as shown in FIG. 1) would optimally have only a single output versus pressure curve for various temperatures. In one form, the capacitive pressure transducer includes a first concave body member extending about a central axis and including a peripheral rim disposed in a first plane which is substantially perpendicular to the central axis. The first concave body member is constructed of a material having a first coefficient of thermal expansion. The capacitive pressure transducer also includes a diaphragm that spans the peripheral rim of the first concave body member and has a first side fixedly coupled to the peripheral rim. The diaphragm and the first concave body member form a first chamber which can be hermetically sealed or pneumatically isolated from the outer region of the pressure transducer. The capacitive pressure transducer further includes a thermal compensation element fixedly coupled to the first concave body member for compensating for thermal expansion or contraction of the first concave body member in response to changes in temperature. The thermal compensation element has a thermal coefficient of expansion that is substantially different from the coefficient of thermal expansion of the first concave body member, so as to establish a bi-metal element as described above.

The bi-metal thermal compensation element can be fixedly coupled to an inside surface or an outside surface of the first concave body member, depending in the relative thermal coefficients and the direction of compensation desired. If the thermal compensation element is fixedly coupled to the inside surface of the first concave body member, the thermal coefficient of expansion of the thermal compensation element may be substantially greater than the coefficient of thermal expansion of the first concave body member, for one desired direction of compensation. In that case, as temperature rises, the tension in the diaphragm is increased by the bi-metal element, to offset a temperature induced decrease in tension due to all other effect such as mismatch of coefficient between the diaphragm and the body. If the thermal compensation element is fixedly coupled to the outside surface of the first concave body member, the thermal coefficient of expansion of the thermal compensation element is preferably substantially less than the coefficient of thermal expansion of the first concave body member, to achieve the same compensation increase in tension with increasing temperatures. The thermal compensation element can be disposed substantially symmetrically about the central axis. For configurations with opposite relative temperature coefficients, that configuration may be reversed.

The capacitive pressure transducer can further include a second concave body member fixedly coupled to the diaphragm on the opposite side thereof from the first concave body member. The second concave body member can also include a thermal compensation element. The thermal compensation element can be fixedly coupled to the inside surface or the outside surface of the second concave body member. The thermal compensation element can be disposed substantially symmetrically about the central axis.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION OF THE PREFERRED EMBODIMENTS

Embodiments of the invention described below are particularly effective in providing temperature compensation for tensioned diaphragm and bending diaphragm capacitance transducers; however, the invention may also be used for other transducers in which physical characteristics and/or geometry of the sensor vary with temperature. For example, temperature dependent positioned changes in an optical sensor in which geometry is important (e.g. in a diffraction grating-biased sensor) can be compensated with the invention.

With particular regard to temperature compensation of sensitivity of a capacitive sensor with a tensioned diaphragm, the sensitivity of a sensor is directly related to the initial tension of the diaphragm. When the diaphragm is highly tensioned, the deflection at a given point of the diaphragm due to a given pressure will be less and the sensitivity will be lower than that of one that is slightly tensioned.

The initial tension, and therefore the sensitivity, can change with temperature. This is due to several reasons such as a mismatched coefficient of expansion of the body material and the diaphragm material. The change of the "modulus of elasticity" of the diaphragm material with temperature can also produce additional change of sensitivity with respect to temperature. If, for instance, the body material has lower expansion coefficient than that of the diaphragm, as temperature goes up, the diaphragm will become less tensioned and the sensitivity will be higher.

According to this invention, to compensate for the sensitivity change of the above example, one would either place a compensating element having higher coefficient of expansion (than that of the body material) on the inside of the body. Or, alternatively one could place a compensating element having lower expansion (than that of the body material) on the outside of the body. In both situation, the curvature of the body will decrease (i.e. flatter) causing the tension to increase, thus compensate for the increase of sensitivity due to other sources mentioned above. The selection of which way to go is based on the availability of materials of suitable coefficient of expansion and many other considerations, such as the compatibility of the material with the working fluid the pressure of which is to be measured. For a capsule type of sensor, the compensating material can be either used on one side of the capsule or it could be distributed on both sides of the capsule. The scheme mentioned here is useful mainly for a tension type diaphragm where the main counter force of the applied pressure is derived from the initial tension of the diaphragm. It is less effective for other type of diaphragm such as a thick, flat diaphragm where the counter force is derived from the bending rigidity of the diaphragm.

With particular regard to temperature compensation of the "zero" of a capacitive sensor with either a tension diaphragm or any other type of diaphragm, the change of initial capacitance can come from many sources, such as the change of the initial gap due to differential expansion of various material of the electrode assembly in the axial direction, the change of dielectric constant of the insulation material, and the change of the area of the electrode with respect to temperature. Of course, other than geometry-based temperature induced variances (e.g. leakage capacitance that varies with temperature) can also be compensated for with geometric changes effected by the invention.

The net sum of the initial capacitance changes with temperature can be compensated for by the use of the bi-metal principle. Assuming that the initial capacitance of a sensor increases with temperature, to compensate for that effect, one would place a compensating element with higher coefficient of expansion (relative to that of the electrode material) on the diaphragm side of the electrode. As temperature increases, the electrode will become domed with the convex side facing the diaphragm, thus reducing the initial capacitance. Alternatively, one could place a compensating element with a lower coefficient of expansion (relative to that of the electrode material) on the side of the electrode away from the diaphragm to achieve the same result. The selection of which way to go is based on the availability of materials of suitable coefficient of expansion and many other considerations, such as the compatibility of the material with the working fluid the pressure of which is to be measured. This compensation scheme for temperature-induced "zero" changes is applicable to capacitance type sensors whether the diaphragm is tensioned or otherwise. Further, such compensation of "zero" does not affect the compensation of sensitivity as described above.

The bi-metal compensation element can be nominally planar (at the reference temperature) and become domed with the change of reference temperature, or it could be domed at the reference temperature and become less domed with change in temperature. Preferably, the bi-metal compensation element is formed by brazing (to ensure good proximity contact), but other joining methods could be used.

Figure 3:
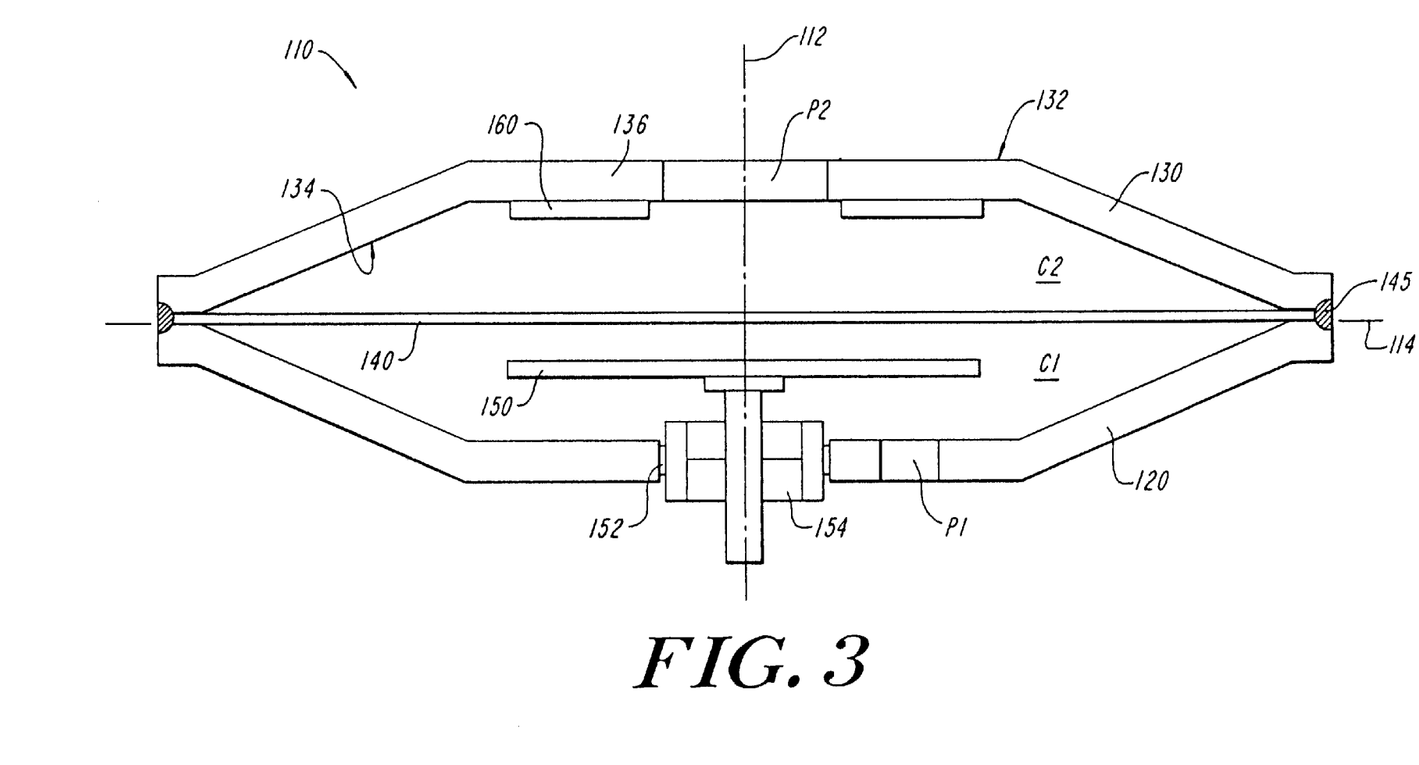
FIG. 3 shows a section view of a tensioned diaphragm capacitive pressure transducer in accordance with the present invention.

FIG. 3 shows a tensioned diaphragm capacitive pressure transducer 110 in accordance with the present invention. The capacitive pressure transducer 110 includes a concave lower body member 120 disposed about a central axis 112, a concave upper body member 130 disposed about the central axis 112 and a diaphragm 140 disposed in a first plane 114. The peripheral rim of the lower body member 120 and, the peripheral rim of the upper body member 130 are securely fastened to opposite sides of the peripheral edge of the diaphragm 140 preferably by welding 145 whereby the diaphragm spans the peripheral rims of each of the lower body member 120 and the upper body member 130. The resulting pressure transducer includes two chambers C1 and C2 that can be pneumatically separated from each other. The lower body member 120 and the upper body member 130 can each include a pressure port P1 and P2 respectively, which permit pressurization by the application of a fluid (liquid or gas) into each of chambers C1 and C2 respectively. The two chambers may be separately pressurized by couplings attached to pressure ports P1 and P2 to establish a pressure differential across the diaphragm. Alternatively, either chamber can be pressurized to a predefined pressure (generally vacuum) and sealed in order to enable the sealed chamber to serve as a reference pressure for performing comparative pressure measurement.

The capacitive pressure transducer can have many types of diaphragms. For example, U.S. Pat. No. 4,434,203, assigned to the assignee of the subject invention, discloses various types of diaphragms that can be utilized in a capacitive pressure transducer embodying the present invention. In this case, which is suitable for measuring low differential pressure, the diaphragm is supported in tension by the peripheral rim of the upper and/or lower body member.

The capacitive pressure transducer can also include an electrode 150 which is secured to the lower body member 120 but electrically insulated therefrom by insulating material 154. By way of example, the insulator 154 can be a glass ceramic or plastic material. The electrode 150 together with the diaphragm 140 form a parallel plate capacitor. The diaphragm 140 includes a portion that is displaceable relative to the electrode 150 in response to changes in pressure in one chamber C2 with respect to the pressure in the other chamber C1. The diaphragm 140 can be conductive or have a portion that is conductive. The change in pressure can be determined as a function of the change in capacitance of the parallel plate capacitor formed by the diaphragm 140 and the electrode 150.

In the preferred embodiment for a tensioned diaphragm transducer, the lower body member 120 and the upper body member 130 are constructed of a material such as 300 series stainless steel and has a known coefficient of thermal expansion. The diaphragm 140 is preferably formed from hard rolled stainless steel having a thickness in the range of 0.0002 to 0.030 inches. The electrode 150 as shown is constructed as a separate assembly and rigidly secured to the lower body member 120 by a solder or adhesive 152 such as disclosed in U.S. Pat. No. 5,442,962, assigned to the assignee of the present invention, which is incorporated by reference herein. The joint can be a glass seal or solder joint, or other form known in the art.

In accordance with the invention, a thermal compensation element 160 can be securely fastened to the inside surface 134 of the upper body member 130, forming a bimetallic element. Preferably, the thermal compensation element 160 is constructed of a material having a coefficient of thermal expansion that is substantially different than the coefficient of thermal expansion of the upper body member 130. The thermal compensation element 160 serves to compensate for differential thermal expansion or contraction of the upper body member 130 relative to the diaphragm that can result in changes in tension of the diaphragm that can change the sensitivity or accuracy of the capacitive pressure transducer.

For one exemplary form, when the upper body member 130 expands, the thermal compensation element 160 secured to the inside concave surface 134 of the upper body member 130, having a lower coefficient of expansion, expands less and thus limits the expansion of the inside concave surface 134 of the upper body member 130 with respect to the outside surface 132 of the upper body member 130. The difference in expansion between the outside surface 132 and the inside surface 134 affects the expansion of the peripheral rim of the concave upper body member 130 and compensates for the increase of tension in the diaphragm caused by lower thermal expansion of the diaphragm compared to that of the sensor body.

In the preferred embodiment, the thermal compensation element 160 is secured to a substantially flat base portion 136 of the upper concave body member 130. Preferably, the thermal compensation element 160 is shaped to conform to the shape of the concave body member (120 or 130) to which it is attached. Thus for example, the thermal compensation element 160 could be a circular annulus to accommodate a round capacitive pressure transducer such as that shown in FIGS. 3–6. The thermal compensation element 160 could take the form of a flat washer having a central opening aligned with the pressure port P2. The thermal compensation element 160 can be secured to the concave body member 130 by any effective method such as brazing, soldering or adhesive.

Figure 4:
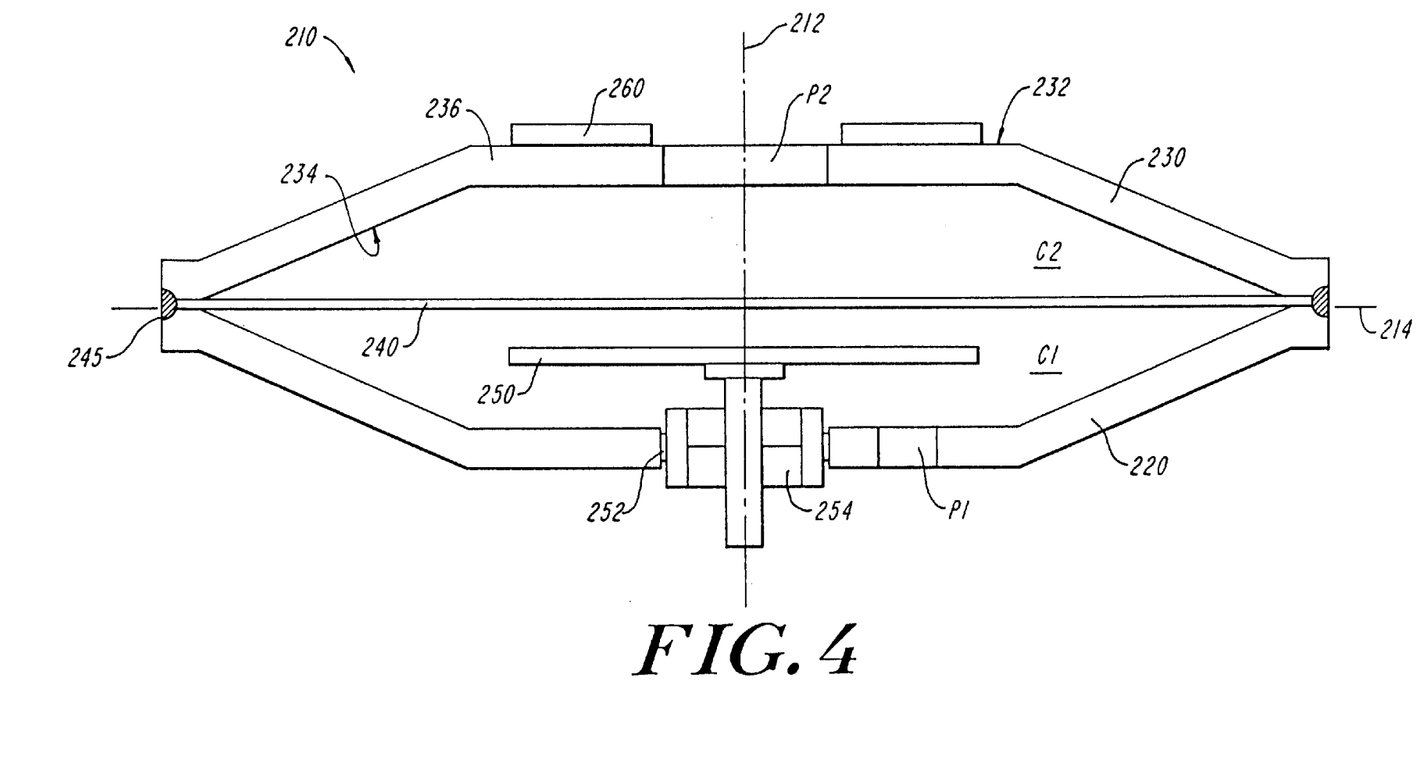
FIG. 4 shows a section view of a tensioned diaphragm capacitive pressure transducer in accordance with an alternative embodiment of the present invention.

FIG. 4 shows a capacitive pressure transducer 210 in accordance with an alternative embodiment of the present invention. The capacitive pressure transducer 210 is similar to that shown in FIG. 3 and includes a concave lower body member 220 disposed about a central axis 212, a concave upper body member 230 disposed about the central axis 212 and a diaphragm 240 disposed in a first plane 214. The peripheral rim of the lower body member 220 and, the peripheral rim of the upper body member 230 are securely fastened to opposite sides of the peripheral edge of the diaphragm 240 preferably by welding 245 whereby the diaphragm spans the peripheral rims of each of the lower body member 220 and the upper body member 230. The capacitive pressure transducer can also include an electrode 250 which is secured to the lower body member 220 but electrically insulated therefrom by insulating material 254. The resulting pressure transducer includes two chambers C1 and C2 that can be pneumatically separated from each other. The lower body member 220 and the upper body member 230 can each include a pressure port P1 and P2 respectively, which permit pressurization by the application of fluid into each of chambers C1 and C2 respectively. The two chambers may be separately pressurized by couplings attached to pressure ports P1 and P2 to establish a pressure differential across the diaphragm. Alternatively, either chamber can be pressurized to a predefined pressure (or vacuum) and sealed in order to enable the sealed chamber to serve as a reference pressure for performing comparative pressure measurement.

In accordance with this embodiment of the invention, a thermal compensation element 260 can be securely fastened to the outside surface 232 of the upper body member 230. Preferably, the thermal compensation element 260 is constructed of a material having a coefficient of thermal expansion that is substantially different coefficient of thermal expansion of the upper body member 230. The thermal compensation element 260 serves to compensate for changes in tension of the diaphragm 240 that result from the differential thermal expansion or contraction of the upper body member 230 and of the diaphragm, causing change in the sensitivity of the capacitive pressure transducer.

In the exemplary case, where the temperature coefficient of element 260 is greater than that of upper body member 230, when the upper body member 230 expands, the thermal compensation element 260 secured to the outside concave surface 232 of the upper body member 230, having a higher coefficient of expansion, expands more and thus increases the expansion of the outside concave surface 232 of the upper body member 230 with respect to the inside surface 234 of the upper body member 230. The difference in expansion between the outside surface 232 and the inside surface 234 affects the expansion of the peripheral rim of the concave upper body member 230 and compensates for the change in tension in the diaphragm caused by differential thermal expansion or contraction of the upper body member 230 and of the diaphragm, causing change in the sensitivity of the capacitive pressure transducer.

Figure 5:
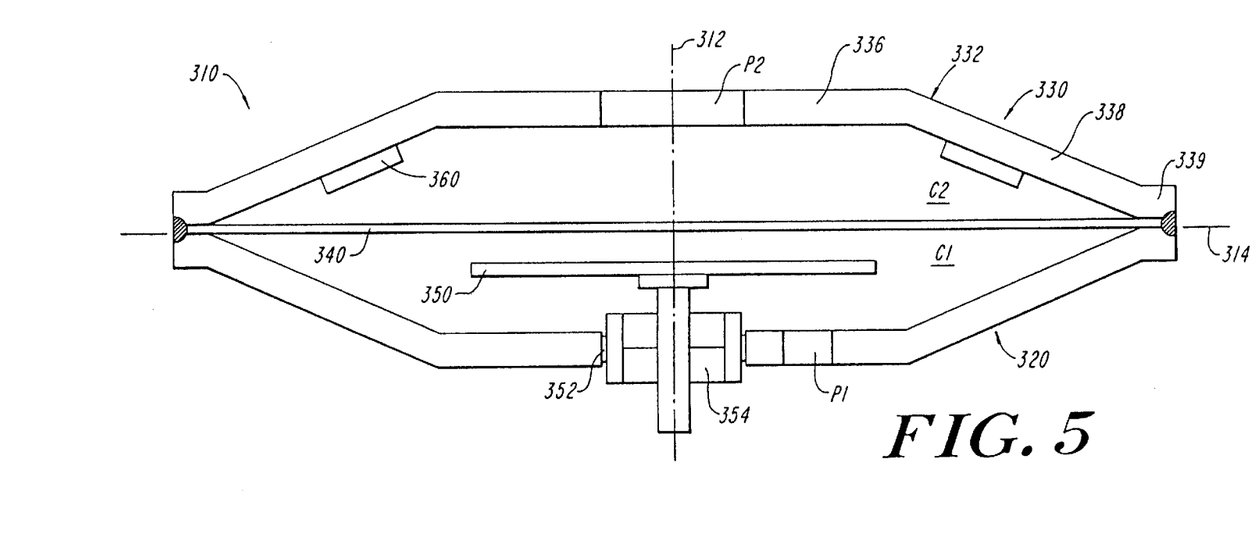
FIG. 5 shows a section view of a tensioned diaphragm capacitive pressure transducer in accordance with an alternative embodiment of the present invention.

FIG. 5 shows a capacitive pressure transducer 310 in accordance with another embodiment of the invention. The capacitive pressure transducer 310 is similar to that shown in FIGS. 3 and 4 and includes a concave lower body member 320 disposed about a central axis 312, a concave upper body member 330 disposed about the central axis 312 and a tensioned diaphragm 340 disposed in a first plane 314. The peripheral rim of the lower body member 320 and, the peripheral rim of the upper body member 330 are securely fastened to opposite sides of the peripheral edge of the diaphragm 340 preferably by welding 345 whereby the diaphragm spans the peripheral rims of each of the lower body member 320 and the upper body member 330. The capacitive pressure transducer can also include an electrode 350 which is secured to the lower body member 320 but electrically insulated therefrom by insulating material 354. The resulting pressure transducer includes two chambers C1 and C2 that can be pneumatically separated from each other. The lower body member 320 and the upper body member 330 can each include a pressure port P1 and P2 respectively, which permit pressurization by the application of air or another gas into each of chambers C1 and C2 respectively.

In accordance with this embodiment of the invention, the upper concave body member 330 includes a substantially planar base portion 336 and an angled portion 338 angled more than 0 degrees but not more than 90 degrees with respect to the plane of the planar base portion 336. The angled portion 338 extends from the planar base portion 336 to the peripheral rim 339. In this embodiment, the thermal compensation element 360 is secured to the angled portion 338 of the upper body member 330. Preferably, the thermal compensation element 360 is formed in a conic shape that conforms to the shape of angled portion 338 to which it is secured, such as the outside surface of a frustum of a cone as shown in FIG. 5.

Figure 6:
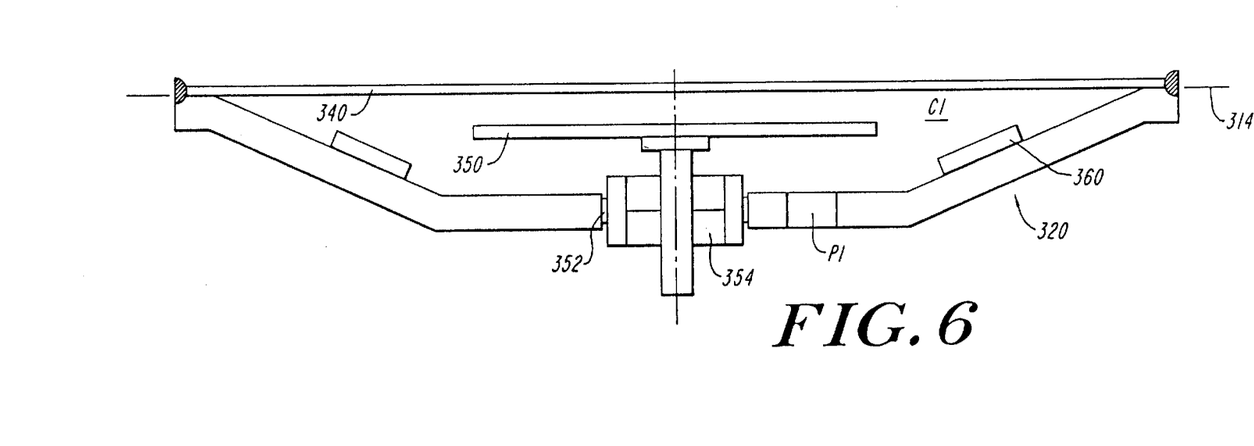
FIG. 6 shows a section view of a "half-shell" tensioned diaphragm pressure transducer in accordance with another embodiment of the invention.

FIG. 6 shows a "half-shell" embodiment in which only a single chamber is established. That embodiment operates in a similar manner to the above described embodiments.

In the various embodiments described above, the compensating elements are shown at specific locations on the body members. However, those (or similar) compensating elements may be affixed to any position on the body member where the resultant bimetallic effect will cause a desired offset to a temperature induced change in diaphragm tension.

Figure 7:
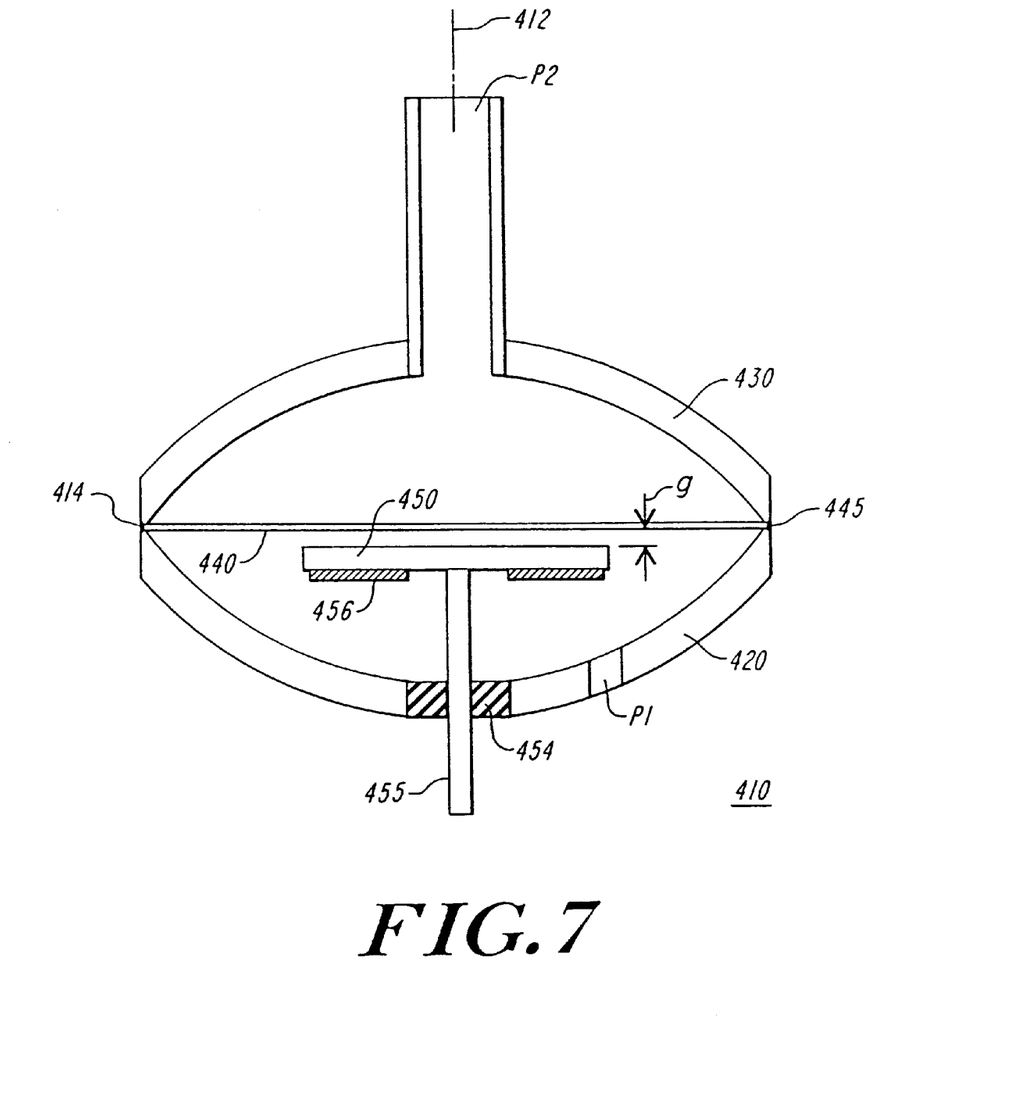
FIG. 7 shows a section view of a capacitive pressure transducer in accordance with an alternative embodiment of the present invention.
Figure 8:
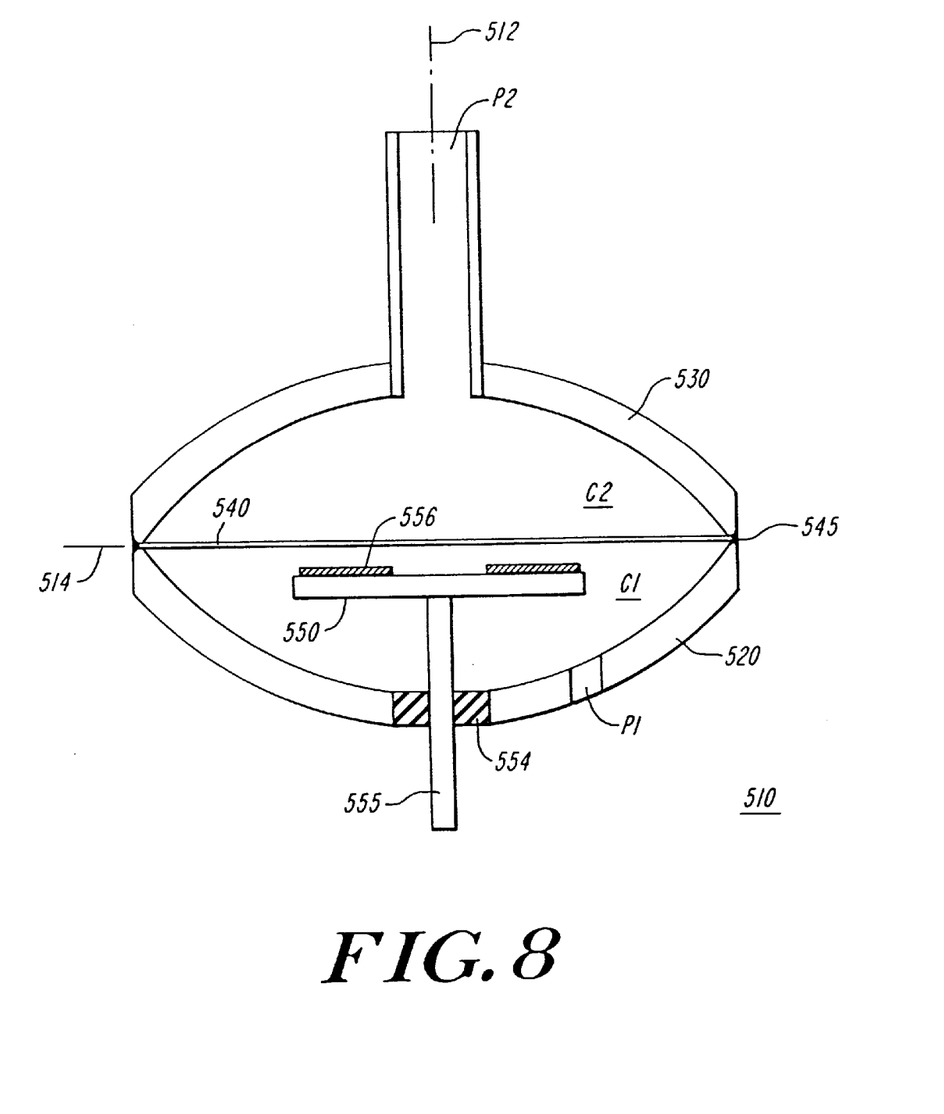
FIG. 8 shows a section view of a capacitive pressure transducer in accordance with an alternative embodiment of the present invention.
Figure 9:
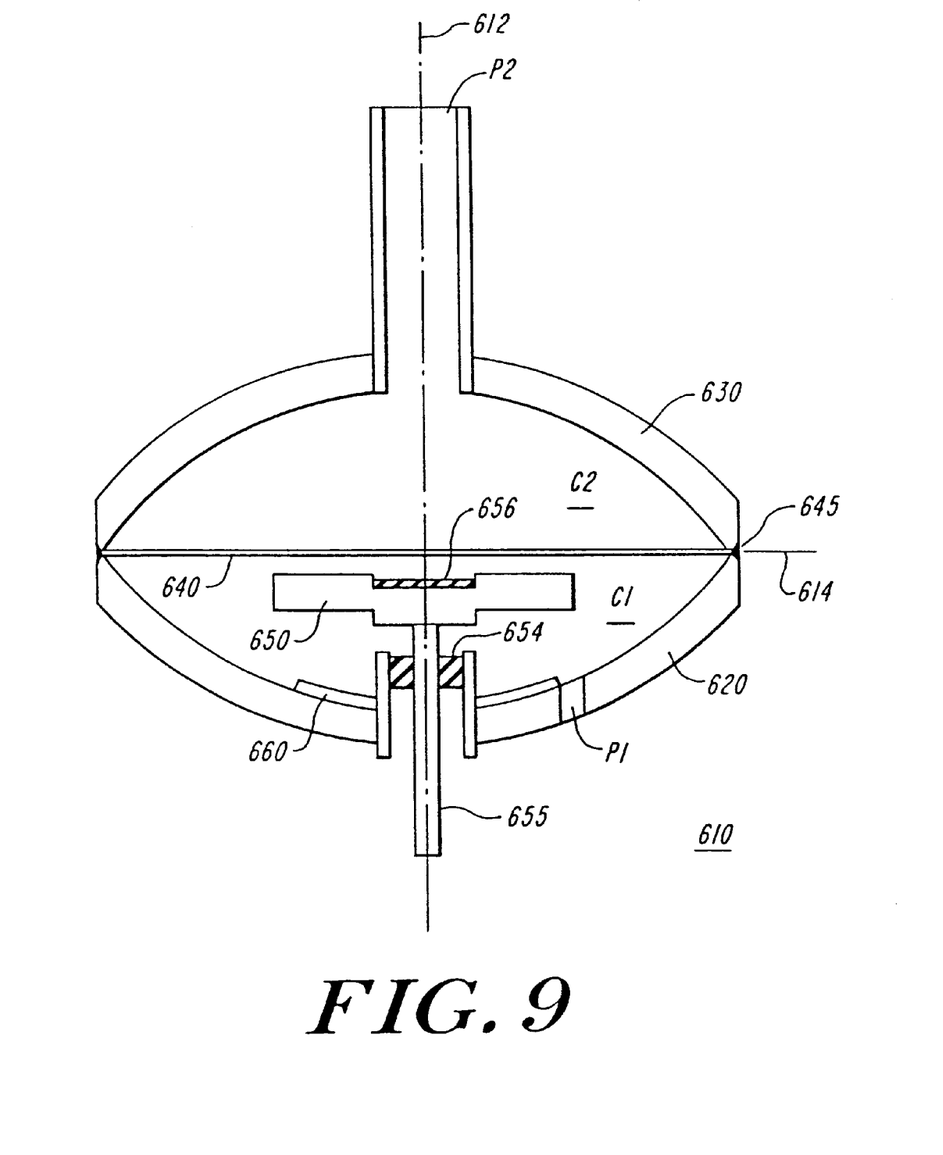
FIG. 9 shows a section view of a capacitive pressure transducer in accordance with an alternative embodiment of the present invention.

FIGS. 7–9 show embodiments of the invention which use the bi-metal compensation principal to effect compensation for temperature induced "changes in zero" for a transducer. The compensation configurations in those FIGS. 7–9 may be identically used in any of the configurations of FIGS. 3–6 for tensioned diaphragm transducers. Each of the configurations in FIGS. 7–9 effect a "doming" of the capacitor plate of the illustrated capacitive sensor. That direction and amount of doming is selectable by the user, depending on the desired geometric change necessary to compensate for the effect of interest, e.g. leakage capacitance. Of course, the bimetallic compensation principal of the "zero" is useful for other sensors as well, such as capacitive (e.g. leakage capacitance), optical, inductive (e.g. leakage inductance), or any configuration where a geometry change can offset a temperature induced parameter change.

FIG. 7 shows a capacitive pressure transducer 410 in accordance with an alternative embodiment of the present invention. The capacitive pressure transducer 410 is similar to that shown in the preceding Figures and includes a concave lower body member 420 disposed about a central axis 412, a concave upper body member 430 disposed about the central axis 412 and a diaphragm 440 disposed in a first plane 414. The peripheral rim of the lower body member 420 and, the peripheral rim of the upper body member 430 are securely fastened to opposite sides of the peripheral edge of the diaphragm 440 preferably by welding 445 whereby the diaphragm spans the peripheral rims of each of the lower body member 420 and the upper body member 430. The capacitive pressure transducer 410 can also include an electrode 450 which is secured to the lower body member 420 but electrically insulated therefrom by insulating material 454. The resulting pressure transducer includes two chambers C1 and C2 that can be pneumatically separated from each other. The lower body member 420 and the upper body member 430 can each include a pressure port P1 and P2 respectively, which permit pressurization by the application of liquid or gas into each of chambers C1 and C2 respectively. The two chambers may be separately pressurized by couplings attached to pressure ports P1 and P2 to establish a pressure differential across the diaphragm. Alternatively, either chamber can be pressurized to a pre-defined pressure or vacuum and sealed in order to enable the sealed chamber to serve as a reference pressure for performing comparative pressure measurement.

In accordance with this embodiment of the invention, a thermal compensation element 456 can be securely fastened to the lower surface of the electrode 450. Preferably, the thermal compensation element 456 is constructed of a material having a coefficient of thermal expansion that is substantially different than the coefficient of thermal expansion of the electrode 450. The thermal compensation element 456 serves to cause the electrode to become slightly domed (as the temperature changes) to compensate for changes in the initial capacitance due to changes in the gap, g caused by differential thermal expansion or contraction of the electrode support member 455 and most of the body or by other reasons such as change of dielectric constant of the insulation material with temperature.

By way of example, where element 456 has a lower temperature coefficient than element 450, when the electrode 450 expands in response to increasing temperature, the thermal compensation element 456 secured to the lower surface of the electrode 450, having a lower coefficient of expansion, expands less and causes the upper surface of electrode 450 to become slightly concave domed, increasing the effective air gap of the electrode forming the parallel plate capacitor. This increasing of air gap and reduction of capacitance compensates for other reasons causing the initial cap to increase. One of these reasons is the differential expansion of the electrode support member 455 and that of the body which places the electrode closer to the diaphragm. The amount and the sign of compensation can be controlled by suitable material selection as well as by varying the geometry of the compensation element 456 including the outside diameter, inside diameter and material thickness.

The change of the shape of the electrode from a flat surface to a domed surface can produce some non-linearity of the output signal with respect to the input pressure. This temperature affect usually is small enough that for most cases it can be ignored. For more critical applications, a donut-shaped electrode, such as shown in FIG. 8 can be used. Theoretical analysis as well as actual measurement indicates that the annular shaped face of the electrode facing the diaphragm can substantially reduce the non-linearity described above.

FIG. 8 shows a capacitive pressure transducer 510 in accordance with an alternative embodiment of the present invention. The capacitive pressure transducer 510 is similar to that shown in the preceding Figures and includes a concave lower body member 520 disposed about a central axis 512, a concave upper body member 530 disposed about the central axis 512 and a diaphragm 540 disposed in a first plane 514. The peripheral rim of the lower body member 520 and, the peripheral rim of the upper body member 530 are securely fastened to opposite sides of the peripheral edge of the diaphragm 540 preferably by welding 545 whereby the diaphragm spans the peripheral rims of each of the lower body member 520 and the upper body member 530. The capacitive pressure transducer 510 can also include an electrode 550 which is secured to the lower body member 520 but electrically insulated therefrom by insulating material 554. The resulting pressure transducer includes two chambers C1 and C2 that can be pneumatically separated from each other. The lower body member 520 and the upper body member 530 can each include a pressure port P1 and P2 respectively, which permit pressurization by the application of fluid into each of chambers C1 and C2 respectively. The two chambers may be separately pressurized by couplings attached to pressure ports P1 and P2 to establish a pressure differential across the diaphragm. Alternatively, either chamber can be pressurized to a predefined pressure (or vacuum) and sealed in order to enable the sealed chamber to serve as a reference pressure for performing comparative pressure measurement.

In accordance with this embodiment of the invention, a thermal compensation element 556 is securely fastened to the upper surface of the electrode 550. Preferably, the thermal compensation element 556 is constructed of a material having a coefficient of thermal expansion that is substantially different than the coefficient of thermal expansion of the electrode 550. Where that coefficient is greater than that of element 550, the thermal compensation element 556 serves to cause the electrode to become slightly convex upward domed (as the temperature increases) to compensate for changes in the initial capacitance due to changes in the gap g caused by differential thermal expansion or contraction of the electrode support member 555 relative to the sensor body member 520.

When the electrode 550 expands, the thermal compensation element 556 secured to the upper surface of the electrode 550, having a higher coefficient of thermal expansion, expands more and causes the electrode 550 to become slightly domed upward convex, increasing the effective gap of the electrode forming the parallel plate capacitor. This increase in the air gap compensates for the differential expansion of the electrode support member 555 and that of the body 526 which places the electrode closer to the diaphragm. The amount and direction of compensation can be controlled by suitable material selection as well as by varying the geometry of the compensation element 556 including the outside diameter, inside diameter and material thickness.

FIG. 9 shows a capacitive pressure transducer 610 in accordance with another alternative embodiment of the present invention. The capacitive pressure transducer 610 is similar to that shown in the preceding Figures and includes a concave lower body member 620 disposed about a central axis 612, a concave upper body member 630 disposed about the central axis 612 and a diaphragm 640 disposed in a first plane 614. The peripheral rim of the lower body member 620 and, the peripheral rim of the upper body member 630 are securely fastened to opposite sides of the peripheral edge of the diaphragm 640 preferably by welding 645 whereby the diaphragm spans the peripheral rims of each of the lower body member 620 and the upper body member 630. The capacitive pressure transducer 610 can also include an electrode 650 which is secured to the lower body member 620 but electrically insulated therefrom by insulating material 654. The resulting pressure transducer includes two chambers C1 and C2 that can be pneumatically separated from each other. The lower body member 620 and the upper body member 630 can each include a pressure port P1 and P2 respectively, which permit pressurization by the application of liquid or gas into each of chambers C1 and C2 respectively. The two chambers may be separately pressurized by couplings attached to pressure ports P1 and P2 to establish a pressure differential across the diaphragm. Alternatively, either chamber can be pressurized to a predefined pressure or vacuum and sealed in order to enable the sealed chamber to serve as a reference pressure for performing comparative pressure measurement.

In accordance with this embodiment of the invention, the effective length of the electrode support element 655 is substantially reduced by having a sleeve which is made of the same or similar material as the lower concave body member 620 and joined together by brazing, soldering or any other acceptable method. The residual thermal expansion affect can be further reduced by using a similar bimetallic interaction shown in FIGS. 7 and 8.

FIG. 9 shows an alternate construction to that shown in FIGS. 7 and 8 for compensating for changes initial capacitance. The electrode 650 can be formed to include a center portion that is offset or recessed. A electrode thermal compensation element in the form of a disk or washer, formed from a material having a different coefficient of thermal expansion, can be brazed, soldered or otherwise affixed to the center portion. FIG. 9 also shows a thermal compensation element 660 affixed to the lower body member 620 to compensate for thermal changes of sensitivity.

When the electrode 650 expands, the thermal compensation element 656 secured to the upper surface of the electrode 650, having a higher coefficient of thermal expansion, expands more and causes the electrode 650 to become slightly domed concave upward, increasing the air gap of the electrode forming the parallel plate capacitor. This increasing in gap compensates for the differential expansion of the electrode support member 655 and the body which places the electrode closer to the diaphragm. The amount and the sign of compensation can be controlled by suitable material selection as well as by varying the geometry of the compensation element 656 including the outside diameter, inside diameter and material thickness.

Preferably, the size and coefficient of thermal expansion of the thermal compensation element is selected based upon consideration of the desired operating temperature range of the capacitive pressure transducer, the coefficients of thermal expansion and the structural geometries of the concave body members and the diaphragm that make up the pressure transducer.

Figure 10:
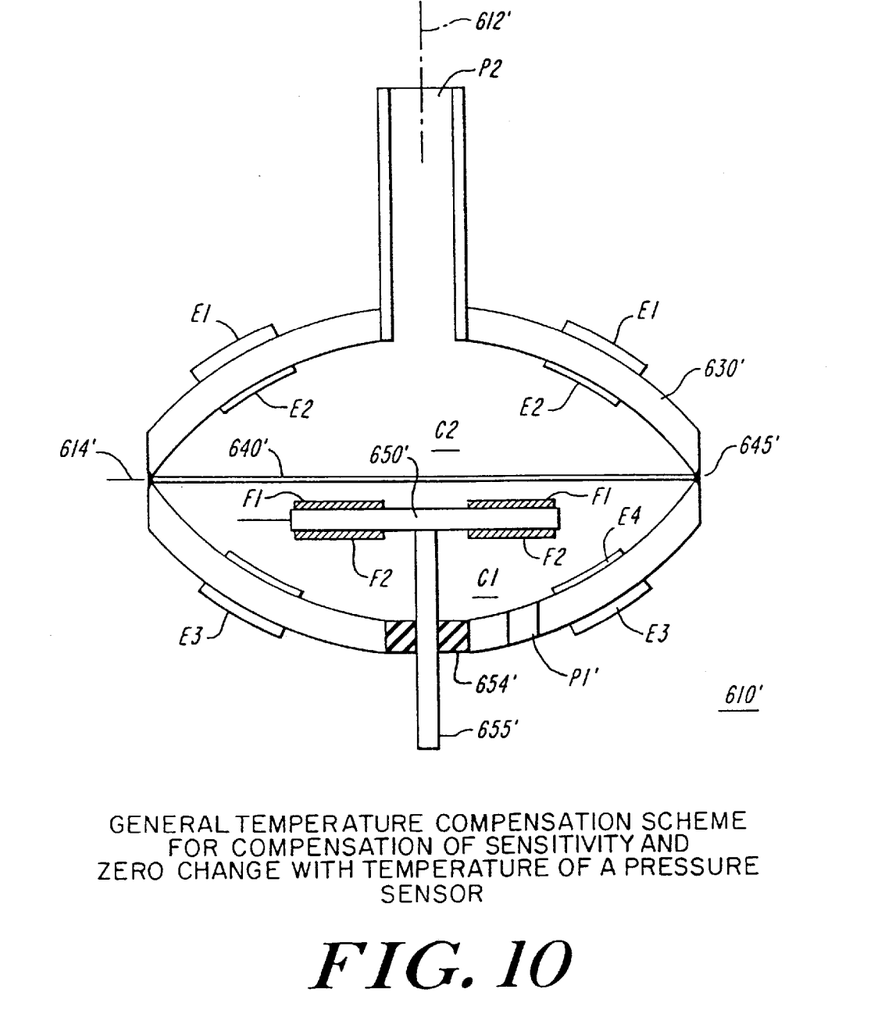
FIG. 10 shows a section view of a capacitive transducer in accordance with another alternative embodiment.

FIG. 10 shows a sensor with a general temperature compensation configuration. The sensor is like that shown in FIG. 9, whose elements similar to corresponding elements in FIG. 9 are marked with the same but "primed" reference designations. The sensor 610' of FIG. 10 has annular compensation elements E1, E2, E3 and E4 whose elements similar to corresponding elements in FIG. 9 are marked with the same but "primed" reference designations affixed to the outside and inside of upper body member 630', and to the outside and inside of lower body member 620', respectively, and has annular compensation elements F1 and F2 affixed to the upper and lower surfaces of electrode 650'. The deployment (or not) and relative temperature coefficients of elements E1–E4 and F1–F2 are selectively determined depending on the structure, and material of the sensor, in accordance with the above teachings. The general shape of the sensors shown in FIGS. 7–10 is different from that of the sensors shown in FIGS. 3–6. The bodies of the former group are formed to approach semi-spherical in shape for maximum rigidity. This feature is desirable if it is important to have minimum deformation of the sensor body (and change of "zero") due to variation of the "line pressure" (i.e. the level of the pressure P1 and P2 relative to the pressure outside the sensor body). The general shape of the sensors shown in FIGS. 3–6 has the advantage of being more compact. The temperature compensation invention described herein applies to both types of design.

In addition to the structure of the sensors 110, 210, 310, 410, 510, 610 and 610' as described above, an electronic circuit (not shown) which includes capacitance sensing instrumentation, such as disclosed in U.S. Pat. No. 4,054,833, may be integrally included with each sensor. The circuit can be positioned on a printed circuit board which is supported by base member 30 or by an external housing. The circuit can be connected to electrode 150, 250, 350, 450, 550, 650 and 650' through the support element via a spring contact extending from the circuit board.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A capacitive pressure transducer comprising
    a first concave body member extending about a central axis and having a peripheral rim disposed in a first plane, said first plane being substantially perpendicular to said central axis, said first concave body member having a first coefficient of thermal expansion;
    a diaphragm having an electrically conductive, displaceable portion, said diaphragm having a peripheral portion fixedly coupled to said peripheral rim of said first body member whereby at least a portion of said diaphragm is disposed substantially in said first plane and forms a first chamber with said first body member;
    an electrode disposed in said first chamber and adjacent the electrically conducting portion of diaphragm at a predefined distance from said first plane, said electrode having a second coefficient of thermal expansion; and
    thermal compensation means, engaging at least one of said first concave body member and said electrode, for compensating for temperature induced changes in characteristics of said transducer, said thermal compensation means having a substantially different coefficient of thermal expansion from said coefficient of thermal expansion of said engaged one of said first body member and said electrode.

2. A capacitive pressure transducer according to claim 1 wherein said thermal compensation means is fixedly coupled to said first concave body member.

3. A capacitive pressure transducer according to claim 2 wherein said thermal compensation means is fixedly coupled to an inside surface of said first concave body member and said thermal compensation means has a coefficient of thermal expansion substantially different than said first coefficient of thermal expansion.

4. A capacitive pressure transducer according to claim 3 wherein said coefficient of thermal expansion of said temperature compensation means is greater than said first coefficient of thermal expansion.

5. A capacitive pressure transducer according to claim 3 wherein said coefficient of thermal expansion of said temperature compensation means is less than said first coefficient of thermal expansion.

6. A capacitive pressure transducer according to claim 2 wherein said thermal compensation means is fixedly coupled to an outside surface of said first concave body member and said thermal compensation means has a coefficient of thermal expansion substantially different than said first coefficient of thermal expansion.

7. A capacitive pressure transducer according to claim 6 wherein said coefficient of thermal expansion of said temperature compensation means is greater than said first coefficient of thermal expansion.

8. A capacitive pressure transducer according to claim 6 wherein said coefficient of thermal expansion of said temperature compensation means is less than said first coefficient of thermal expansion.

9. A capacitive pressure transducer according to claim 1 wherein said thermal compensation means is symmetrical about a reference axis and is disposed symmetrically about said central axis.

10. A capacitive pressure transducer according to claim 9 wherein said thermal compensation means comprises a disk fixedly coupled to said first concave body member.

11. A capacitive pressure transducer according to claim 10 wherein said disk includes a centrally located circular opening.

12. A capacitive pressure transducer according to claim 1 wherein said electrode is coupled to said first concave body member.

13. A capacitive pressure transducer according to claim 12 wherein said electrode has a top surface facing said diaphragm and a bottom surface facing away from said diaphragm and said thermal compensation means includes a disk, fixedly coupled to said electrode, for compensating for changes in capacitance between the diaphragm and the electrode in response to changes in temperature, said disk having a substantially different coefficient of thermal expansion from said second coefficient of thermal expansion.

14. A capacitive pressure transducer according to claim 13 wherein said thermal compensation means is fixedly coupled to said top surface of said electrode and said thermal compensation means has a coefficient of thermal expansion substantially different than said second coefficient of thermal expansion.

15. A capacitive pressure transducer according to claim 14 wherein said coefficient of thermal expansion of said temperature compensation means is greater than said second coefficient of thermal expansion.

16. A capacitive pressure transducer according to claim 14 wherein said coefficient of thermal expansion of said temperature compensation means is less than said second coefficient of thermal expansion.

17. A capacitive pressure transducer according to claim 13 wherein said thermal compensation means is fixedly coupled to said bottom surface of said electrode and said thermal compensation means has a coefficient of thermal expansion substantially different than said second coefficient of thermal expansion.

18. A capacitive pressure transducer according to claim 17 wherein said coefficient of thermal expansion of said temperature compensation means is greater than said second coefficient of thermal expansion.

19. A capacitive pressure transducer according to claim 17 wherein said coefficient of thermal expansion of said temperature compensation means is less than said second coefficient of thermal expansion.

20. A capacitive pressure transducer according to claim 19 wherein said disk includes a centrally located circular opening.

21. A capacitive pressure transducer according to claim 1 further comprising a second concave body member extending about said central axis and having a peripheral rim disposed in said first plane, and wherein said peripheral rims of said first concave body member and said second concave body member are coupled together whereby said diaphragm forms a second chamber with said second body member, said second body member having a third coefficient of thermal expansion.

22. A capacitive pressure transducer according to claim 12 said capacitive pressure transducer further includes additional thermal compensation means, fixedly coupled to said second concave body member, for compensating for temperature induced changes in characteristics of said transducer,
    said additional thermal compensation means having a substantially different coefficient to thermal expansion from said third coefficient of thermal expansion.

23. A capacitive pressure transducer according to claim 22 wherein said thermal compensation means is fixedly coupled to an inside surface of said second concave body member and said thermal compensation means has a coefficient of thermal expansion substantially different than said first coefficient of thermal expansion.

24. A capacitive pressure transducer according to claim 23 wherein said coefficient of thermal expansion of said temperature compensation means is greater than said third coefficient of thermal expansion.

25. A capacitive pressure transducer according to claim 23 wherein said coefficient of thermal expansion of said temperature compensation means is less than said third coefficient of thermal expansion.

26. A capacitive pressure transducer according to claim 22 wherein said thermal compensation means is fixedly coupled to an outside surface of said second concave body member and said thermal compensation means has a coefficient of thermal expansion substantially different than said third coefficient of thermal expansion.

27. A capacitive pressure transducer according to claim 26 wherein said coefficient of thermal expansion of said temperature compensation means is greater than said third coefficient of thermal expansion.

28. A capacitive pressure transducer according to claim 26 wherein said coefficient of thermal expansion of said temperature compensation means is less than said third coefficient of thermal expansion.

29. A capacitive pressure transducer comprising
- a first concave body member extending about a central axis and having a peripheral rim disposed in a first plane, said first plane being substantially perpendicular to said central axis, said first concave body member having a first coefficient of thermal expansion;
- a second concave body member extending about said central axis and having a peripheral rim disposed in said first plane, said second concave body member having a second coefficient of thermal expansion
- a diaphragm having an electrically conductive, displaceable portion, said diaphragm having a first side of a peripheral portion fixedly coupled to said peripheral rim of said first body member whereby at least a portion of said diaphragm is disposed substantially in said first plane and forms a first chamber with said first body member;
- and having a second side of a peripheral portion fixedly coupled to peripheral rim of said second body member whereby at least a portion of said diaphragm forms second chamber with said second body member;
- an electrode disposed in said first chamber and adjacent the electrically conductive portion of said diaphragm at a predefined distance from said first plane, said electrode having a third coefficient of thermal expansion; and
- one or more thermal compensation elements, fixedly coupled to at least one of said first concave body member, said second concave body member and said electrode, adapted for compensating for temperature induced changes in characteristics of said transducer, said thermal compensation element having a substantially different coefficient of thermal expansion from the coefficient of thermal expansion of the corresponding coupled first concave body member, second body member and electrode.

30. A capacitive pressure transducer according to claim 29 wherein said thermal compensation elements are fixedly coupled to an inside surface of one or both of said first and second concave body members and said thermal compensation elements have coefficient of thermal expansion substantially different than said first or second or both coefficients of thermal expansion.

31. A capacitive pressure transducer according to claim 29 wherein said thermal compensation elements are fixedly coupled to an outside surface of one or both said first and second concave body members and said thermal compensation elements have coefficients of thermal expansion substantially different than said first or second coefficients of thermal expansion.

32. A capacitive pressure transducer according to claim 29 further comprising:
- an electrode thermal compensation element fixedly coupled to said electrode, adapted for compensating for changes in capacitance between the diaphragm and the electrode due thermal expansion or contraction of the electrode in response to changes in temperature, said electrode thermal compensation element having a substantially different coefficient of thermal expansion from said third coefficient of thermal expansion.

33. A capacitive pressure transducer comprising
- a first concave body member extending about a central axis and having a peripheral rim disposed in a first plane, said first plane being substantially perpendicular to said central axis, said first concave body member having a first coefficient of thermal expansion;
- a diaphragm having an electrically conductive, displaceable central portion, said diaphragm having a peripheral portion fixedly coupled to said peripheral rim of said first body member whereby at least a portion of said diaphragm is disposed substantially in said first plane and forms a first chamber with said first body member;
- an electrode coupled to said first concave body member and having a substantially planar surface disposed in said first chamber adjacent the electrically conductive portion of said diaphragm at a predefined distance from said first plane, said electrode having a second coefficient of thermal expansion; and
- at least one thermal compensation element, engaging said electrode, adapted for compensating for temperature induced changes in characteristics of said transducer, said thermal compensation element having a substantially different coefficient of thermal expansion from said second coefficient of thermal expansion.

* * * * *